United States Patent Office 3,253,880
Patented May 31, 1966

3,253,880
SULFONATION OF ACRYLONITRILE POLYMERS WITH SULFUR TRIOXIDE TO INCREASE DYE RECEPTIVITY
Julian K. Lawson, Jr., Raleigh, and Jean B. Bond, Durham, N.C., assignors to The Chemstrand Corporation, Decatur, Ala., a corporation of Delaware
No Drawing. Filed Oct. 9, 1961, Ser. No. 143,599
11 Claims. (Cl. 8—115.5)

This invention relates to dye-receptive polymers and fibers prepared therefrom. More specifically, the invention relates to a method for the direct sulfonation of acrylonitrile polymers and fibers in order to improve their dye receptivity.

It is well known that polyacrylonitrile and also copolymers, interpolymers and blends of more than 35 percent of acrylonitrile have excellent fiber-forming properties. These polymers produce fibers with superior tensile properties, desirable elongation, and excellent stability under a wide range of physical and chemical conditions. However, such fibers do not have sufficient dye affinity to enable the development of satisfactory colored fibers or a wide range of colors unless they are subjected to further treatments. Some of the more attractive dyes recently developed belong to the basic category. For this reason, attempts have been made to develop means to incorporate acidic groups into acrylic polymers, either by copolymerizing acidic materials or by preparing copolymer blends. Neither of these methods is without disadvantages.

Accordingly, it is an object of this invention to provide a method whereby polymers containing at least 35 percent by weight of acrylonitrile may be rendered more receptive to basic dyes by incorporating sulfonic acid groups into the polymer. It is another object of this invention to provide basic dye receptive acrylonitrile polymer fibers. Another object of the invention is to provide a method of incorporating sulfonate groups into acrylonitrile fibers, filaments and other shaped objects cheaply and without undue difficulty or discoloration. Other objects and advantages of the invention will become apparent from the description hereinafter.

In general, the objects of this invention are accomplished by exposing acrylonitrile polymers to sulfur trioxide. The sulfur trioxide may be introduced into the polymer in solution form in a solvent which is inert to the trioxide or as an attenuated vapor, as by dilution with a suitable compound such as dry nitrogen.

The temperature of the reaction may vary from about −50° C. to 50° C., preferably from about 20° C. to 30° C. Temperatures below about −50° C. inhibit the reaction and those above about 50° C. are undesirable because of probable charring of the polymer.

The ratio of sulfur trioxide to polymer should not be too high, to avoid possible discoloration or even charring. When using sulfur trioxide in solution up to a 15% concentration of sulfur trioxide in a suitable solvent may be employed. The total amount of sulfur trioxide available for the reaction should not be over one mole for every two moles of original monomer present in the polymer. Best results are obtained by using one mole of sulfur trioxide per 8 to 12 moles of acrylonitrile, which is equivalent to about 4.9 percent to 7.4 percent by weight of sulfur in the treated fiber. The minimum ratio is one mole of sulfur trioxide per 50 moles of acrylonitrile. When using sulfur trioxide in vapor form comparable limitations are applicable.

Suitable solvents which may be used in the practice of this invention include many typical spinning solvents for acrylic fibers. Such solvents as dimethyl formamide, dimethyl sulfoxide and dimethyl acetamide may be used both to dissolve the sulfur trioxide and as spinning solvents for the polymer. Solvents which are preferably used to dissolve sulfur trioxide only include sulfur dioxide, carbon tetrachloride, halogenated hydrocarbons such as 2,2-dichlorodiethyl ether, 1,2-dichloroethane and perfluorinated compounds. The solvent employed must be free from active hydrogen atoms in all instances to prevent violent reaction with sulfur trioxide.

The polymer may be employed in any suitable form including solutions in certain solvents, powdered polymer, fibers, filaments, knitted or woven fabrics, or any other form in which the polymer as a textile fiber is likely to be encountered. Reaction is dependent on the amount of exposed surface area available for treatment, therefore, the preferred form from the standpoint of surface area exposed is dry polymer powder. Spinning solutions containing from 10 to 35 percent of polymer may also be successfully treated by the process of this invention.

The invention is not applicable to all polymers, copolymers and blends of polyacrylonitrile. Only those monomers which are inert to sulfur trioxide should be employed because some monomers employed in copolymers and blends of polyacrylonitrile either inactivate or destroy sulfur trioxide or are themselves destroyed by sulfur trioxide. Monomers which are stronger Lewis bases than aliphatic nitriles, and those which contain OH, NH or SH groups, such as pyridines and other similar strong bases, polyhydroxy compounds and poly-amino compounds, are inoperable in this invention.

Suitable acrylonitrile polymers include polyacrylonitrile, coplymers, interpolymers and blends thereof, particularly those containing at least 80 percent by weight of polymerized or copolymerized acrylonitrile, keeping in mind the above-noted limitation.

For example, the polymer may be a copolymer of from 80 to 98 percent of acrylonitrile and from 2 to 20 percent of another copolymerizable mono-olefinic monomer. Suitable copolymerizable mono-olefinic monomers include acrylic, alpha-chloroacrylic and methacrylic acids; the acrylates, such as methylmethacrylate, ethylmethacrylate, butylmethyacrylate, methoxymethyl methacrylate, beta-chloroethyl methacrylate, and the corresponding esters of acrylic and alpha-chloroacrylic acids; vinyl chloride, vinyl fluoride, vinyl bromide, vinylidene chloride; 1-chloro-1-bromoethylene; methacrylonitrile; methyl vinyl ketone; vinyl carboxylates, such as vinyl acetate, vinyl chloroacetate, vinyl propionate, and vinyl stearate; N-vinylimides, such as N-vinylphthalimide and N-vinylsuccinimide; methylene malonic esters, itaconic acid and itaconic ester; N-vinyl carbazole; vinyl furan; alkyl vinyl esters; vinyl sulfonic acid; ethylene alpha, beta-dicarboxylic acids or their anhydrides or derivatives, such as diethylcitraconate, diethylmesaconate, styrene, vinyl naphthalene, and other mono-olefinic copolymerizable monomeric materials.

Polymers containing less than 80 percent by weight of acrylonitrile and as little as 35 percent acrylonitrile are likewise applicable to the process of this invention. Polymers, copolymers and blends containing from 35 to 80 percent by weight of acrylonitrile are useful in forming fibers, films, coating compositions and molded articles. For example, the process is applicable to fibers formed from a copolymer of 40 percent acrylonitrile and 60 percent vinyl chloride and to a terpolymer of 67 percent acrylonitrile, 21 percent vinyl chloride and 12 percent vinylidene chloride.

The polymers, useful in the practice of the present invention, may be prepared by any conventional polymerization procedures, such as mass polymerization methods, solution polymerization methods, or aqueous emulsion procedures. The articles manufactured from the solutions formed therewith may be produced by well-known conventional methods, for example, the wet-spinning method for producing fibers. If it is desired to produce shaped articles from the sulfonated acrylonitrile polymer solutions of the present invention which have a modified appearance or modified properties, various agents may be added to the solutions to accomplish these effects prior to the fabrication of the articles without any ill effects thereon. Such added agents might be pigments, dyes, antistatic agents, fire-retarding agents, etc.

By comparison with most other suggested procedures, the present invention is advantageous in that small amounts of the dye receptor are employed, cost is low, and the process is adaptable to and easily incorporated into most spinning systems. Surprisingly, acrylonitrile polymers are not appreciably discolored when treated with sulfur trioxide by the direct sulfonation process of this invention. Prior art methods of incorporation of sulfur into acrylonitrile polymers nearly always resulted in some undesirable discoloration of the polymers.

The invention is further illustrated by the following examples in which all parts and percents are by weight unless otherwise indicated.

Example I

About 20 ml. of liquid sulfur trioxide were diluted with about 200 ml. of carbon tetrachloride. A scoured dry sample fiber of an acrylonitrile polymer containing 94.6 percent acrylonitrile and 5.4 percent vinyl acetate was added and allowed to stand in the liquid for 30 minutes. The fiber was washed and dried at 100° C. The fiber dyed to a deep shade using Sevron Blue B.

Example II

A 16% spinning solution was prepared using the polymer of Example I dissolved in dimethylformamide. The solution was treated with sulfur trioxide dissolved in a small amount of dimethylformamide, the amounts being chosen so that 9 monomer units of acrylonitrile were present for each mole of sulfur trioxide used. The solution was heated at 100° C. for 1–2 hours and then spun to 3 denier fiber. An untreated control fiber was also produced from the same 16% spinning solution. The basic dye acceptance (BDA) was measured and recorded.

| Fiber: | BDA |
|---|---|
| Control | 3.18 |
| Test | 8.92 |

Example III

A 20% spinning was prepared using the polymer of Example I dissolved in dimethyl sulfoxide. The solution was stirred at room temperature while sulfur trioxide entrained in a stream of carefully dried nitrogen was passed over the surface of the solution. The process of vaporizing the sulfur trioxide required about 3 hours. Fibers were spun from the solution and from a control sample. The following results were obtained.

| Fiber: | BDA |
|---|---|
| Control | 6.11 |
| Test | 10.12 |

As many variations of the present invention may be made without departing from the spirit and scope thereof the same is intended to be limited solely by the scope of the appended claims.

We claim:
1. A process for rendering acrylonitrile polymers more dye receptive consisting of contacting a polymer comprising at least 35 percent acrylonitrile with one mole of sulfur trioxide per 8 to 12 moles of acrylonitrile so as to incorporate about 4.9% to 7.4% by weight of sulfur in the polymer and at a temperature of from −50° C. to 50° C.

2. The process of claim 1 wherein the polymer is in the form of a filament.

3. The process of claim 1 wherein the polymer is in the form of a solution of from 10 to 35 percent by weight of said polymer in an acrylonitrile polymer solvent free of active hydrogen atoms.

4. A process for preparing dye receptive acrylonitrile polymers consisting of contacting a polymer containing at least 80 percent acrylonitrile and up to 20 percent of a suitable copolymerizable mono-olefinic monomer with one mole of sulfur trioxide per 8 to 12 moles of acrylonitrile so as to incorporate about 4.9% to 7.4% by weight of sulfur in the polymer and at a temperature of from −50° C. to 50° C.

5. The process of claim 4 wherein the mono-olefinic monomer is vinyl acetate.

6. The process of claim 4 wherein the polymer comprises polyacrylonitrile.

7. The process of claim 4 wherein the sulfur trioxide is in the form of a solution in a solvent free of active hydrogen atoms.

8. The process of claim 4 wherein the sulfur trioxide is in the form of a vapor.

9. A process for rendering acrylonitrile polymers more dye receptive consisting of contacting a polymer containing 80 to 98 percent acrylonitrile and 2 to 20 percent vinyl acetate dissolved in dimethylformamide with a solution of sulfur trioxide in dimethylformamide, the sulfur trioxide being applied in an amount of one mole of sulfur trioxide per 8 to 12 moles of acrylonitrile so as to incorporate about 4.9% to 7.4% by weight of sulfur in the polymer.

10. A process consisting of contacting a fiber of an acrylonitrile polymer containing 80 to 98 percent acrylonitrile and 2 to 20 percent vinyl acetate with a solution of sulfur trioxide in carbon tetrachloride, the sulfur trioxide being applied in an amount of one mole of sulfur trioxide per 8 to 12 moles of acrylonitrile so as to incorporate about 4.9% to 7.4% by weight of sulfur in the polymer.

11. A process for rendering acrylonitrile polymers more dye receptive consisting of contacting a polymer containing from 80 to 98 percent acrylonitrile and 2 to 20 percent vinyl acetate dissolved in dimethyl sulfoxide with vaporous sulfur trioxide, the sulfur trioxide being applied in an amount of one mole per 8 to 12 moles of acrylonitrile so as to incorporate about 4.9% to 7.4% by weight of sulfur in the polymer.

References Cited by the Examiner

UNITED STATES PATENTS

| 2,794,793 | 6/1957 | Coover | 260—88.7 |
| 2,832,698 | 4/1958 | Walles | 117—47 |
| 2,835,655 | 5/1958 | Bauman et al. | 260—85.5 |
| 3,079,210 | 2/1963 | Mikula | 8—55 |

FOREIGN PATENTS

| 1,006,383 | 4/1957 | Germany. |

JOSEPH L. SCHOFER, Primary Examiner.

JOSEPH R. LIBERMAN, LEON J. BERCOVITZ, Examiners.

H. WONG, Assistant Examiner.